(12) United States Patent
Roy et al.

(10) Patent No.: US 9,081,538 B1
(45) Date of Patent: Jul. 14, 2015

(54) DATA CENTER WITH MULTI-LEVEL ROOF STRUCTURE

(71) Applicant: Switch Communications Group LLC, Las Vegas, NV (US)

(72) Inventors: Rob Roy, Las Vegas, NV (US); Richard James Grabmeier, Shawnee, KS (US); Mark Kevin Smith, Kansas City, MO (US)

(73) Assignee: Switch LLC, Las Vegas, NV (US)

( * ) Notice: Subject to any disclaimer, the term of this patent is extended or adjusted under 35 U.S.C. 154(b) by 110 days.

(21) Appl. No.: 13/651,303

(22) Filed: Oct. 12, 2012

(51) Int. Cl.
*E04B 7/00* (2006.01)
*G06F 1/16* (2006.01)
*G06F 1/20* (2006.01)
*E04D 3/36* (2006.01)

(52) U.S. Cl.
CPC .............. *G06F 1/16* (2013.01); *E04D 3/3608* (2013.01); *G06F 1/20* (2013.01)

(58) Field of Classification Search
CPC ........... G06F 1/16; G06F 1/20; E04D 3/3608; E04D 3/357; E04D 13/1618; E04B 7/00
USPC .......... 52/90.2, 91.3, 93.1, 263, 173.1, 302.1, 52/745.06; 165/96; 361/690, 691, 694, 361/695
See application file for complete search history.

(56) References Cited

U.S. PATENT DOCUMENTS

| | | | | |
|---|---|---|---|---|
| 1,363,407 A * | 12/1920 | Goudie | ........................... | 52/93.1 |
| 4,073,099 A * | 2/1978 | Van Der Lely et al. | ........... | 52/69 |
| 4,472,920 A * | 9/1984 | Simpson | ....................... | 52/741.4 |
| 4,528,789 A * | 7/1985 | Simpson | ....................... | 52/404.3 |
| 4,602,468 A * | 7/1986 | Simpson | ....................... | 52/410 |
| 4,620,397 A * | 11/1986 | Simpson et al. | ................... | 52/66 |
| 5,005,323 A * | 4/1991 | Simpson et al. | ................. | 52/90.2 |
| 5,142,838 A * | 9/1992 | Simpson et al. | ................. | 52/640 |
| 5,600,924 A * | 2/1997 | Forsberg | ........................ | 52/93.2 |
| 5,704,170 A * | 1/1998 | Simpson | ....................... | 52/90.1 |
| 5,743,063 A * | 4/1998 | Boozer | ............................ | 52/713 |
| 5,857,292 A * | 1/1999 | Simpson | ........................... | 52/22 |
| 5,875,592 A * | 3/1999 | Allman et al. | ................. | 52/90.2 |
| 6,301,853 B1 * | 10/2001 | Simpson et al. | ................. | 52/520 |
| 6,672,955 B2 * | 1/2004 | Charron | ........................ | 454/184 |
| 6,859,366 B2 * | 2/2005 | Fink | ............................... | 361/690 |

(Continued)

FOREIGN PATENT DOCUMENTS

GB 2228024 A * 8/1990 ................ E04B 7/02
WO WO 02052107 A2 * 7/2002 ................ E04H 5/02

*Primary Examiner* — Brent W Herring
(74) *Attorney, Agent, or Firm* — Pillsbury Winthrop Shaw Pittman LLP

(57) ABSTRACT

The methods and apparatuses described herein include a data center having a three-level roof structure including an overarching rainfly roof to protect the data center from severe weather events. The three-level roof structure further includes a secondary roof structure below the rainfly roof structure as well as a lower redundant roof structure coupled together. A data hall within the data center has a ceiling below the lower redundant roof structure and is adapted to store a plurality of cabinets to hold electronic equipment. The lower redundant roof structure can be coupled with the secondary roof structure using an airtight seal such that the data center is airtight allowing for the data hall below to be positively pressurized to facilitate air flow through the electronic equipment. Heated air emitted from the electronic equipment is conducted through into a hot air return region above the data hall ceiling, while cold air is supplied to the electronic equipment below the data hall ceiling.

34 Claims, 9 Drawing Sheets

(56) References Cited

U.S. PATENT DOCUMENTS

| | | | |
|---|---|---|---|
| 6,980,433 B2 * | 12/2005 | Fink | 361/690 |
| 7,568,360 B1 * | 8/2009 | Bash et al. | 62/186 |
| 7,574,839 B1 * | 8/2009 | Simpson | 52/520 |
| 7,903,407 B2 * | 3/2011 | Matsushima et al. | 361/695 |
| 8,061,087 B2 * | 11/2011 | Ray | 52/90.2 |
| 8,498,114 B2 * | 7/2013 | Martini | 361/695 |
| 2003/0209023 A1 * | 11/2003 | Spinazzola et al. | 62/259.2 |
| 2005/0225936 A1 * | 10/2005 | Day | 361/687 |
| 2011/0232209 A1 * | 9/2011 | Boersema | 52/173.1 |
| 2012/0014061 A1 * | 1/2012 | Slessman | 361/691 |
| 2013/0340361 A1 * | 12/2013 | Rogers | 52/173.1 |
| 2014/0137491 A1 * | 5/2014 | Somani et al. | 52/220.1 |

\* cited by examiner

DATA CENTER WITH MULTI-LEVEL ROOF STRUCTURE

FIELD OF THE RELATED ART

This application relates generally to data centers, and more particularly to providing a data center having a multi-level roof structure.

BACKGROUND

Organizations of all types, such as on-line retailers, Internet service providers, search providers, financial institutions, universities, and other computing-intensive organizations, conduct computer operations from large scale computing facilities. Such computing facilities, often referred to as data centers, house and accommodate a large amount of server, network, and computer equipment to process, store, and exchange data as needed to carry out an organization's operations. Typically, a data center includes many server racks, each of which may include many servers and associated computer equipment. Information Technology (IT) operations are a crucial aspect of most organizational operations. One of the main concerns is business continuity—companies rely on their information systems to run their operations. If a system becomes unavailable, company operations may be impaired or stopped completely. It is necessary therefore to provide a reliable infrastructure for IT operations in order to minimize any chance of disruption. Severe weather conditions such as earthquakes, tornados or hurricanes can damage or destroy a data center roof and potentially disrupt the operations of a large number of the data center's customers and their data. Information security is also a concern, and for this reason data centers offer a secure environment which minimizes the chances of a security breach.

Further, because a data center may contain a large number of servers that include many electrical components, a large amount of electrical power may be required to operate the facility. The electrical power is distributed to a large number of locations spread throughout the computer room (e.g., many racks spaced from one another, and many servers in each rack). Electronic components in computer systems such as integrated circuits, printed circuit boards, mass storage devices, power supplies, processors, etc. generate excess heat. As an example, computers with multiple processors may generate 250 watts of waste heat. Multiply that figure by several thousand (or tens of thousands) to account for the amount of computers in a large data center, and one can readily appreciate the amount of heat that can be generated. A plurality of larger, multiple-processor computers configured into rack-mounted components within a racking system can generate a substantial amount of waste heat. To remedy this, data centers include mechanisms for waste heat removal from a plurality of racking systems, typically by circulating air through one or more of the rack systems. Many data centers therefore rely on air conditioning systems to maintain the temperature and other environmental conditions in the data center within acceptable limits.

A data center must maintain high standards for assuring the integrity and functionality of its hosted computer environment. This is generally accomplished through robust structural design and redundancy, including redundancy of processing resources, communication channels, as well as power and emergency backup power generation.

SUMMARY

The methods and apparatuses described herein include a data center having a three-level roof structure including an overarching rainfly roof to protect the data center from severe weather events. The three-level roof structure further includes a secondary roof structure below the rainfly roof structure as well as a lower redundant roof structure coupled to the secondary roof structure. The rainfly roof is supported by framing members including main steel beams and perpendicular purlins. There are also perpendicular purlins sandwiched between the lower two roof structures. In one embodiment, the purlins of the rainfly roof are offset from the purlins between the lower two roof structures such that any airborne object during a severe weather event can become lodged into one or more of the sets of offset framing members to keep it from penetrating all three roof levels.

A data hall within the data center has a ceiling below the lower redundant roof structure and is adapted to store a plurality of cabinets to hold electronic equipment. In one embodiment, the lower redundant roof structure is coupled with the secondary roof structure using an airtight seal such that the data center is airtight allowing for the data hall below to be positively pressurized to facilitate air flow through the electronic equipment. Heated air emitted from the electronic equipment is conducted through into a hot air return region above the data hall ceiling while cold air is supplied to the electronic equipment below the data hall ceiling. The data center may also include ventilation at both ends of the data center as well as an exterior drainage system coupled with the rainfly roof to drain rainwater away from the data center.

BRIEF DESCRIPTION OF THE DRAWINGS

These and other aspects and features will become apparent to those ordinarily skilled in the art upon review of the following description of specific embodiments of the invention in conjunction with the accompanying figures, in which.

DETAILED DESCRIPTION

Figure 1:
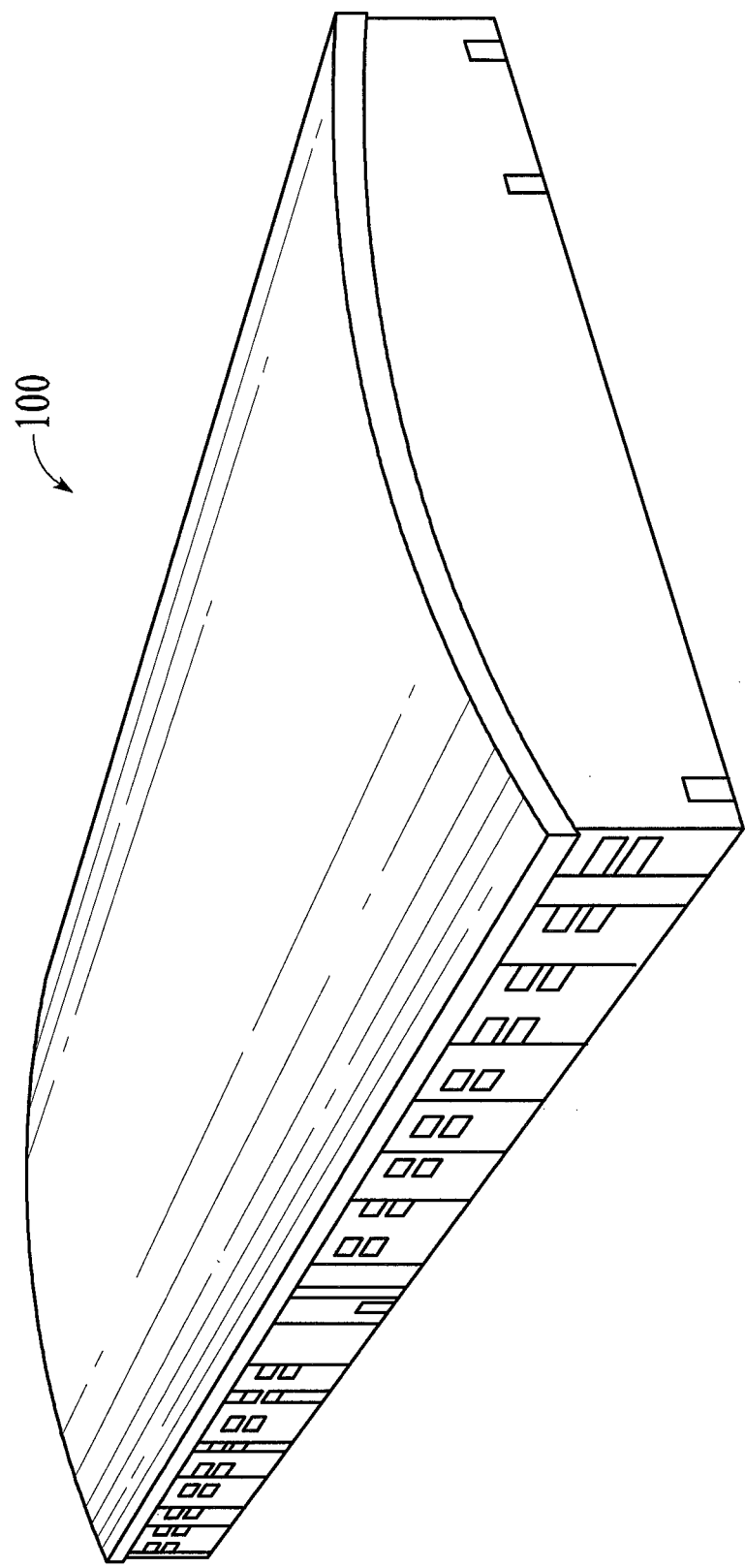
FIG. 1 depicts an example of a data center according to one embodiment.

For the purposes of explanation, numerous specific details are set forth throughout this description in order to provide a thorough understanding. It will be appreciated, however, by persons skilled in the art that the embodiments described herein may be practiced without some of these specific details. In other instances, well-known structures and devices are shown in block diagram form to avoid obscuring the underlying principles of the various embodiments.

Methods and apparatuses described herein include a data center having a three-level roof structure including an overarching rainfly roof to protect the data center from severe weather events. The rainfly roof can have an arched or gabled roof structure. The three-level roof structure further includes a secondary roof structure below the rainfly roof structure as well as a lower redundant roof structure coupled to the secondary roof structure. The rainfly roof is supported by framing members including main steel beams and perpendicular purlins. There are also perpendicular purlins sandwiched between the lower two roof structures. In one embodiment, the purlins of the rainfly roof are offset with the purlins between the lower two roof structures such that any airborne object during a severe weather event can become lodged into one or more of the sets of offset framing members to keep it from penetrating all three roof levels.

A data hall within the data center has a ceiling below the lower redundant roof structure. The data hall is adapted to store a plurality of cabinets of electronic equipment. In one embodiment, the lower redundant roof structure is coupled with the secondary roof structure using an airtight seal such that the data center is airtight allowing for the data hall below to be positively pressurized to facilitate air flow through the electronic equipment. The data center may also include a plurality of air conditioning units located alongside the outside of the data center to deliver cool air to the cabinets of electronic equipment in the data hall. The data center may also include one or more cold air supply openings located adjacent to a cold air supply region below the data hall ceiling and one or more hot air exhaust openings located adjacent to a hot air return region above the data hall ceiling. The plurality of cabinets of electronic equipment can be positioned in rows such that heated air from the electronic equipment conducts from the cabinets in each row through chimneys in the data hall ceiling into a hot air return region above. The heated air then conducts out of the data center through one or more of the hot air exhaust openings to feed air conditioning units alongside the data center coupled with the hot air exhaust openings. Cold air is supplied to the electronic equipment below the ceiling of the data hall from the air conditioning units through cold air supply openings.

The data center can also be coupled with a mechanism to control a plurality of air conditioning units located alongside the outside of the data center to deliver cool air into the cabinets of electronic equipment in the data hall. The data center may also include ventilation at both ends adjacent to the hot air return region below the rainfly roof of the data center. This ventilation can be used to prevent or minimize condensation build up on the bottom side of the rainfly roof, which could cause the formation of ice or ice dams on the rainfly roof that could affect the integrity of the roof structure.

In addition, in at least certain embodiments all three roof structures are designed to be robust and watertight and may include an exterior drainage system coupled with the rainfly or secondary roof structures to drain rainwater away from the data center. The techniques described herein are designed to provide structural redundancy to protect the contents of the data center. The three-level roof structure provides three independent levels of redundancy for increased protection of the electronic equipment within the data hall. The secondary and lower roof structures are designed to remain intact in the event of a catastrophic rainfly roof failure, for instance, in cases where the rainfly roof is torn completely off by a severe weather event such as a tornado or hurricane. Further, the lower roof structure 320 is also designed to remain intact even if both of the top two roof structures are damaged or destroyed. This redundancy provides exceptional structural protection to the data center for improved protection of the electronic equipment stored therein.

As used herein the term data center refers to a facility used to house computer systems and associated components, such as telecommunications and storage systems. It generally includes redundant or backup power supplies, redundant data communications connections, environmental controls, e.g., air conditioning, fire suppression, as well as security devices. The techniques disclosed herein are intended to be applicable to a data center of any size. FIG. 1 depicts an example of a data center according to one embodiment. In this illustration, data center 100 includes an arched outer roof and low-profile design for structural integrity in the event of a severe weather event. Effective data center operation requires a balanced investment in both the facility and the housed equipment. The first step is to establish a baseline facility environment suitable for equipment installation. Standardization and modularity can yield savings and efficiencies in the design and construction of telecommunications data centers. Standardization means integrated building and equipment engineering. Modularity has the benefits of scalability and easier growth. For these reasons, data centers are generally planned in repetitive building blocks of equipment, and associated power and support equipment.

Figure 2:
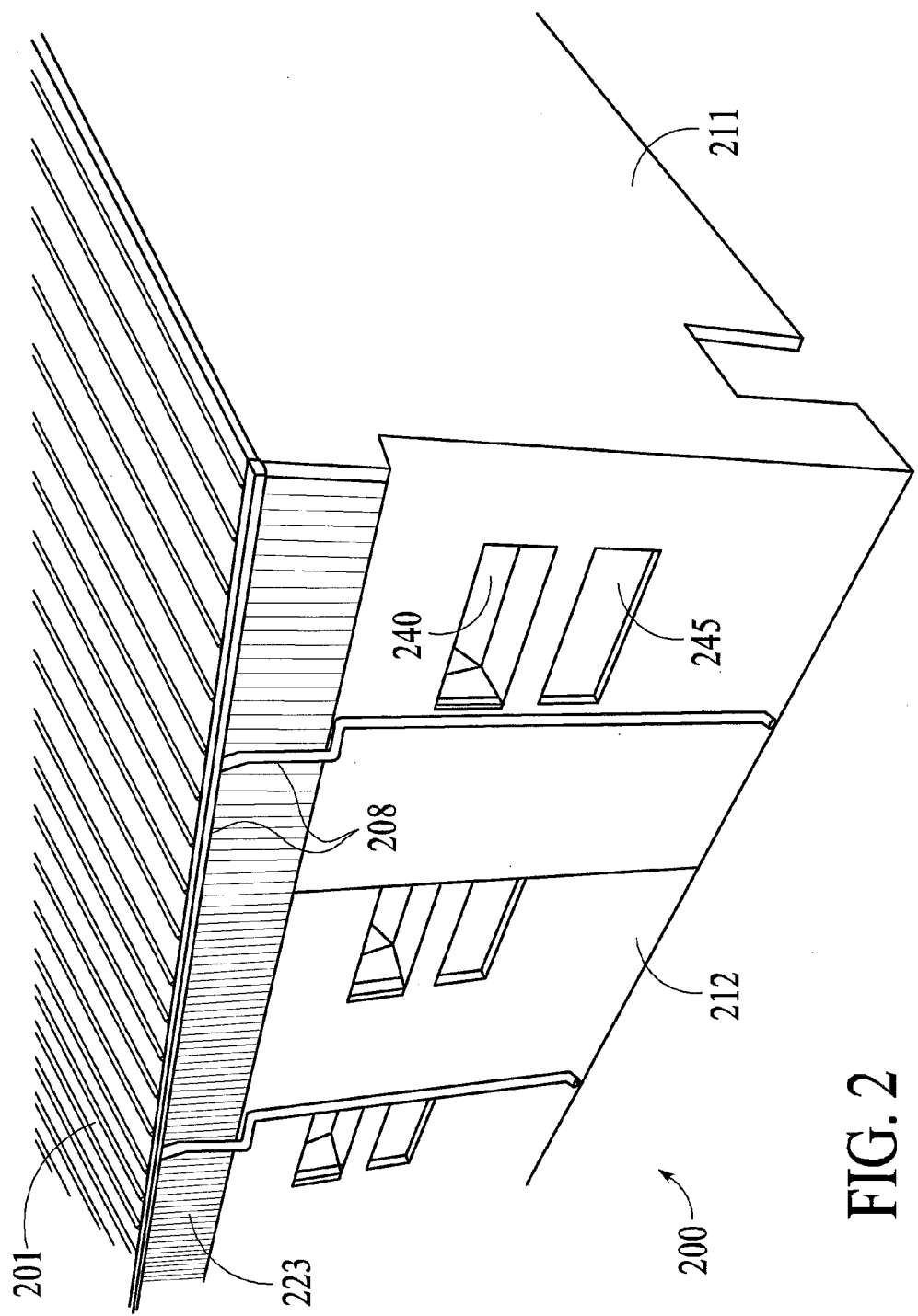
FIG. 2 depicts an example side view of a data center according to one embodiment.

FIG. 2 depicts an example side view of a data center according to one embodiment. In the illustrated embodiment, data center 200 includes a rainfly roof structure 201 configured to protect the data center from severe weather events. The rainfly roof 201 includes an arched roof coupled with an exterior roof drainage system 208 for draining rainwater away from the data center. The rainfly roof 201 also can include a fascia panel 223, concrete end wall 211 and concrete side wall 212. In some embodiments, the fascia panel 223 may be insulated. Also included on the concrete side wall 212 are the cool air supply openings 245 and hot air exhaust openings 240 discussed above that are used to maintain acceptable temperatures inside the data center.

Figure 3:
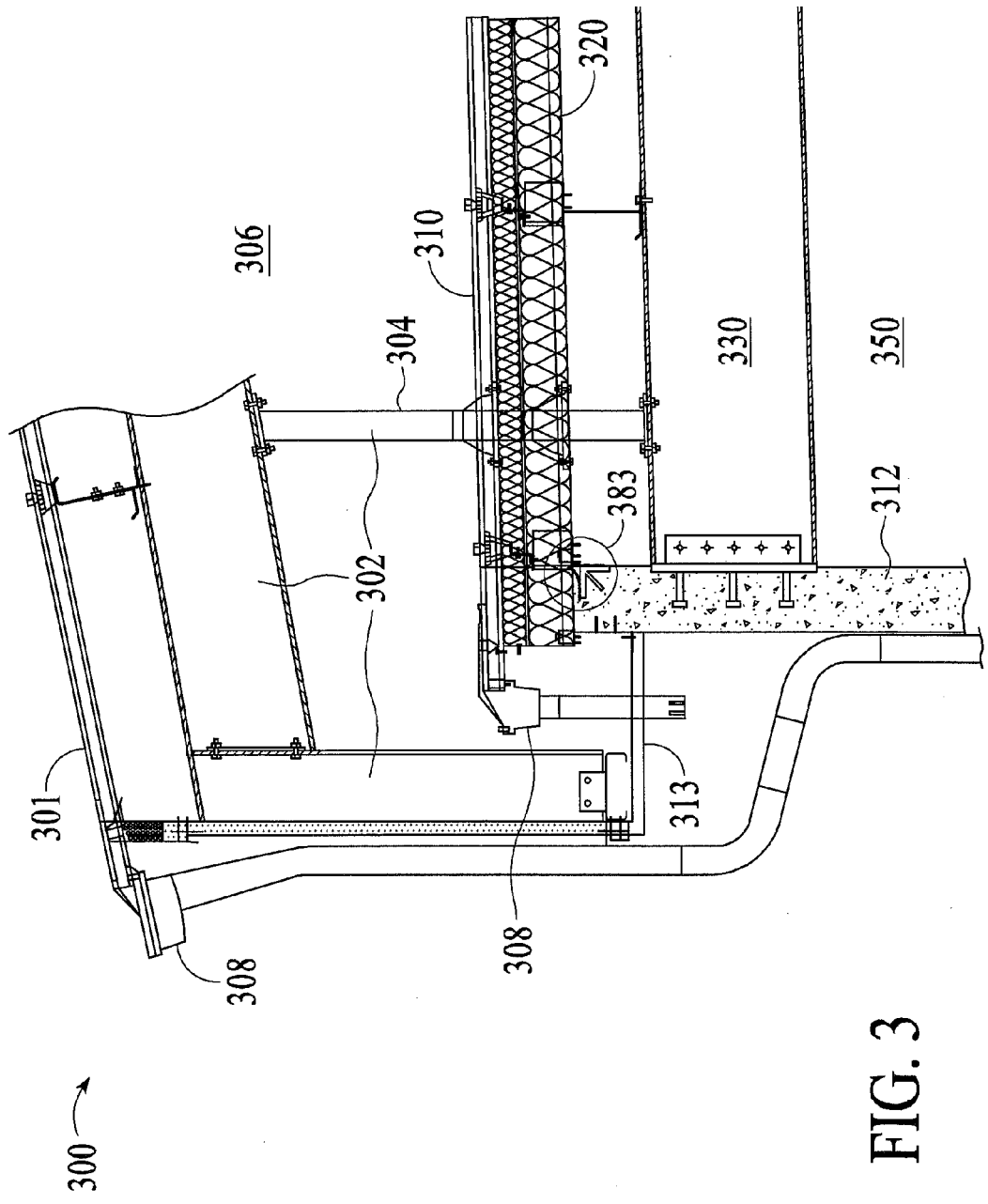
FIG. 3 depicts an example roof system according to one embodiment.

FIG. 3 depicts an example roof system according to one embodiment. In this example, system 300 includes a rainfly roof 301 having an arched roof built upon a rainfly structure 302 that includes vertical columns 304 and beams coupled thereto. In alternative embodiments, the rainfly roof 301 can be any gabled, curved, or bowed structure. Vertical columns 304 provide structural support for the rainfly structure 302 and attach at opposite ends to the main roof support beams 330. As shown, the rainfly columns 304 are assembled through the secondary and redundant roof structures 310 and 320, respectively. System 300 includes a secondary roof structure 310 below the rainfly roof 301 that is coupled with rainfly columns 304. Taken together, the rainfly structure 302 and the secondary roof structure 310 define a first region at the top portion of the data center referred to in the figure as the rainfly cavity 306. Beneath the lower roof 320 is a ceiling (not shown) of the data hall where the computer equipment is stored. In one embodiment, the data hall ceiling is built 15 feet below the lower roof 320.

System 300 further includes a third, lower roof structure built below the secondary roof structure referred to as redundant roof structure 320. This lower redundant roof structure 320 can be coupled with the secondary roof structure 310 via the rainfly columns 304. The lower roof 320 can also be coupled with the main roof support beams 330 of the data center building, which are connected to the outer concrete sidewalls 312 in the illustration. Taken together, the lower roof structure 320 and the data hall ceiling define a hot air return region (cavity) of the data center, referred to as the plenum cavity 350 in the figure. In the preferred embodiment, the secondary roof 310 and lower roof 320 are flat, although embodiments are not limited to that as other embodiments are contemplated within the scope of this description. For instance, the secondary and lower roof structures 310 and 320 may be flat or angled. They may also be sloped in the middle or at either or both sides. They could be also be inverted with respect to the rainfly roof or each other. The specific configuration of the lower two roof structures is not critical to the embodiments described herein.

In one embodiment, insulation can be sandwiched between the secondary roof 310 and lower roof 320 to further protect the electronic equipment stored and maintained in the data center. There can also be an airtight sealed joint 383 placed at the intersection of the rainfly columns and roof structures 310 and 320 to make the overall structure airtight allowing the data hall to be positively pressurized to facilitate air flow through the cabinets of electronic equipment stored therein. Together, airtight sealed joint 383 and the insulation between the lower two roof structures can be used to prevent or minimize condensation from forming on the bottom of the rainfly roof, which can result in formation of ice dams on the bottom side of the rainfly roof that could affect the integrity of the rainfly roof structure.

System 300 further includes a redundant roof drainage system. In the illustration, rainfly roof structure 301 is coupled with an exterior drainage system 308. The secondary roof structure 310 is also coupled with the exterior drainage system 308. The secondary roof structure 310 includes this redundant gutter system for emergency roof drainage in cases of leaks in the rainfly roof structure 301. As shown, the gutter system 308 expels water through soffit 313. In one embodiment all three roof structures are designed to be watertight.

Figure 4:
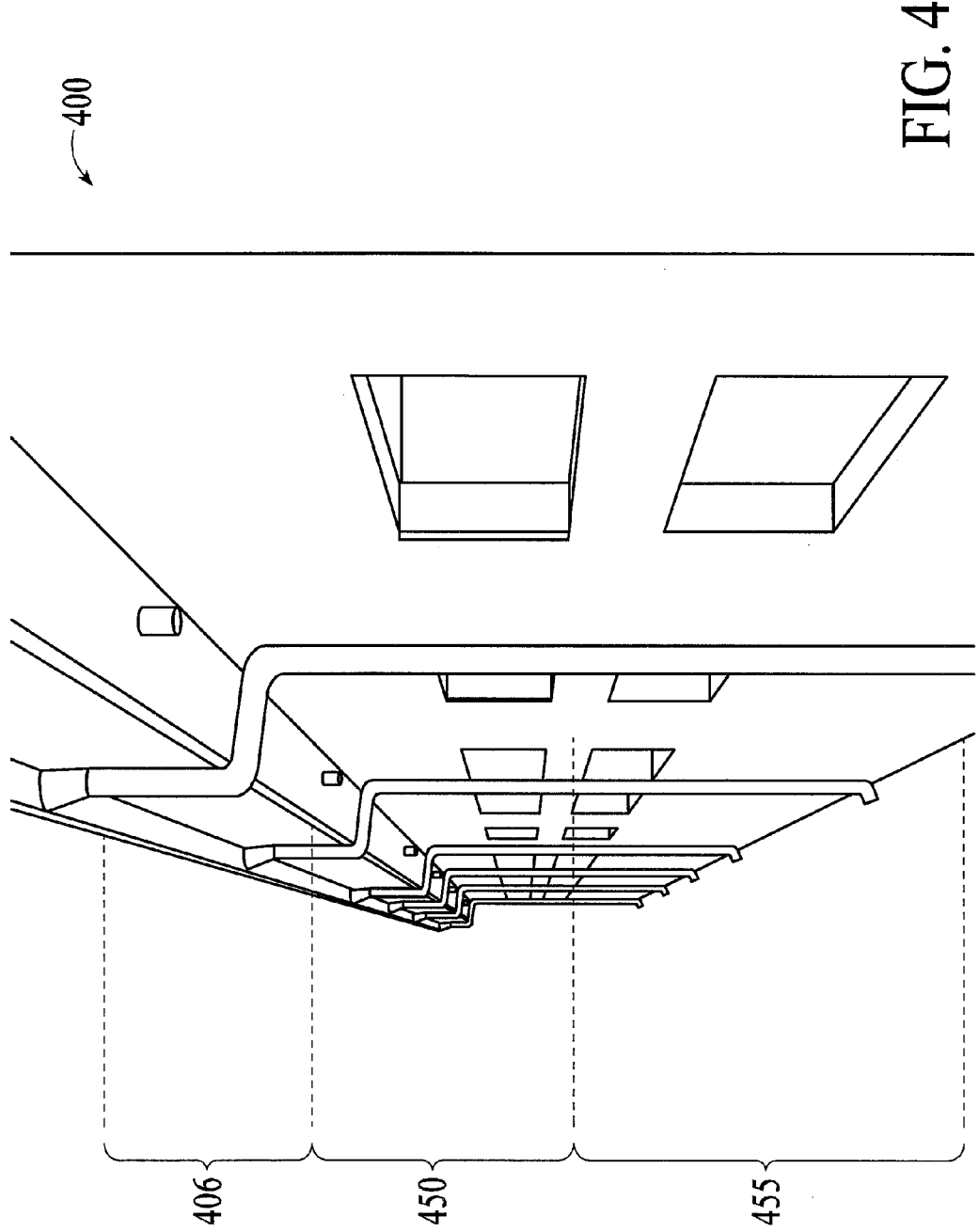
FIG. 4 depicts an example side view of a data center according to one embodiment.

In addition to structural protection, data centers also include mechanisms adapted to remove waste heat from the facility. FIG. 4 depicts an example side view of a data center according to one embodiment. This depiction shows the relationship of the rainfly cavity 406, the hot air return region (plenum cavity 450), and the cold air supply region 455 of the embodiments described herein from the outside of the data center. Data Center 400 is adapted to supply cool air from one or more air conditioning units located alongside the cold air supply openings on the outside of the data center to deliver cool air into the cabinets of electronic equipment in the data hall as shown and described in U.S. Pat. No. 8,180,495, entitled "Air Handling Control System for a Data Center," the disclosure of which is incorporated by reference in its entirety as well as the applications it claims priority to including U.S. Provisional Application No. 61/040,636 entitled "Electronic Equipment Data Center or Co-Location Facility Designs and Methods of Making and Using the Same," filed on Mar. 28, 2008 and U.S. patent application Ser. No. 12/138,771 entitled "Electronic Equipment Data Center or Co-location Facility Designs and Methods of Making and Using the Same," filed Jun. 13, 2008, which claims priority to U.S. Provisional Application No. 60/944,082 entitled "Electronic Equipment Data Center or Co-location Facility Designs and Methods of Making and Using the Same," filed Jun. 14, 2007. As shown in FIG. 4, cold air can flow into the data center 400 through cold air intake openings 455 and hot air can flow out of the data center through the hot air return openings 450. The hot air flowing through the hot air return openings can be used to feed air conditioning units positioned alongside the data center and coupled with the hot air return openings 450. Likewise, cold air can be provided to the data center from the adjacent air conditioning units through the cold air intake openings 455 coupled therewith. In at least certain embodiments, the rainfly cavity is unconditioned.

Figure 5:
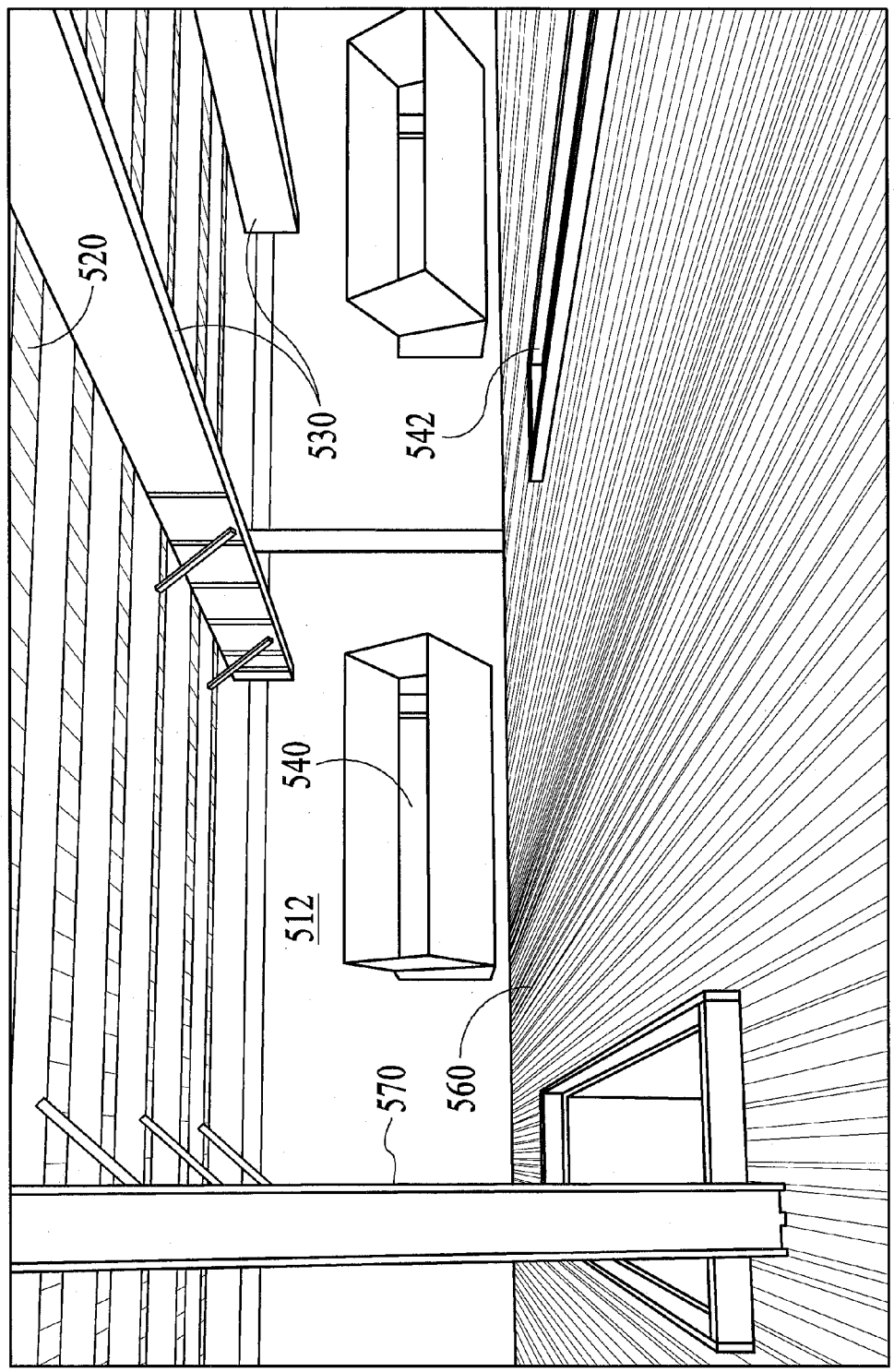
FIG. 5 depicts an example hot air return region according to one embodiment.

FIG. 5 depicts an example of the hot air return region according to one embodiment. In the illustrated embodiment, the hot air return region (plenum cavity) 550 is located above the data hall ceiling (plenum floor) 560 and below the lower redundant roof 520. As shown, there can be one or more heat chimneys 542 positioned through the plenum floor 560 to conduct heated air out of the data hall through the data hall ceiling 560 into the hot air return region 550 above in order for the heated air to eventually conduct out of the data center through one or more hot air exhaust openings 540 located on the sides (in the concrete side walls 512) of the data center. In one embodiment, the hot air exhaust openings 540 feed the heated air into the plurality of air conditioning units discussed previously. There is also shown in the figure the main structural columns 570 running down from the main roof beams 530 down into the data hall through the hot air cavity 550. There can also be an insulation layer (not shown) between the secondary roof structure and the lower redundant roof structure 520.

Figure 6A:
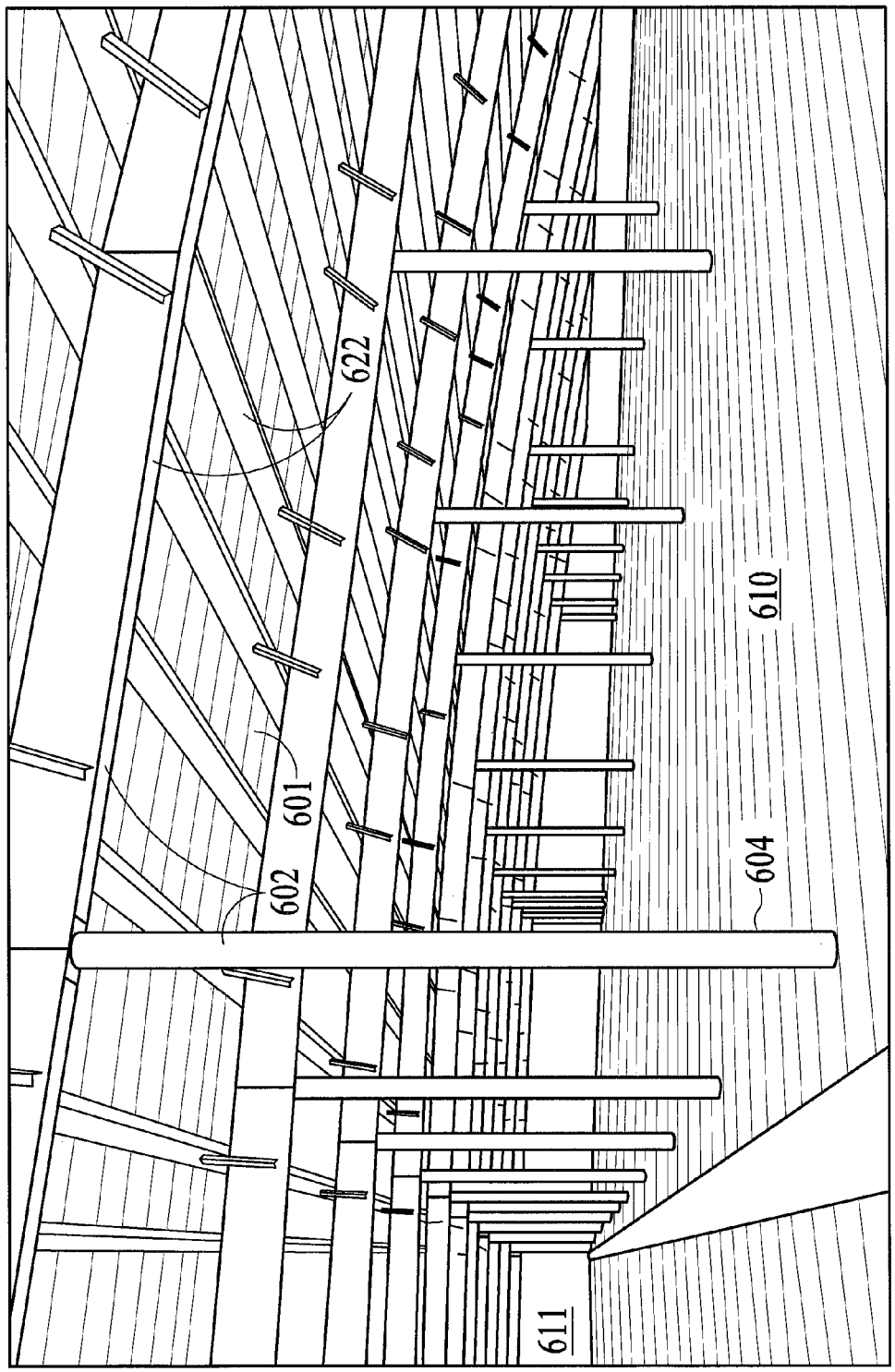
FIG. 6A depicts an example rainfly cavity according to one embodiment.
Figure 7:
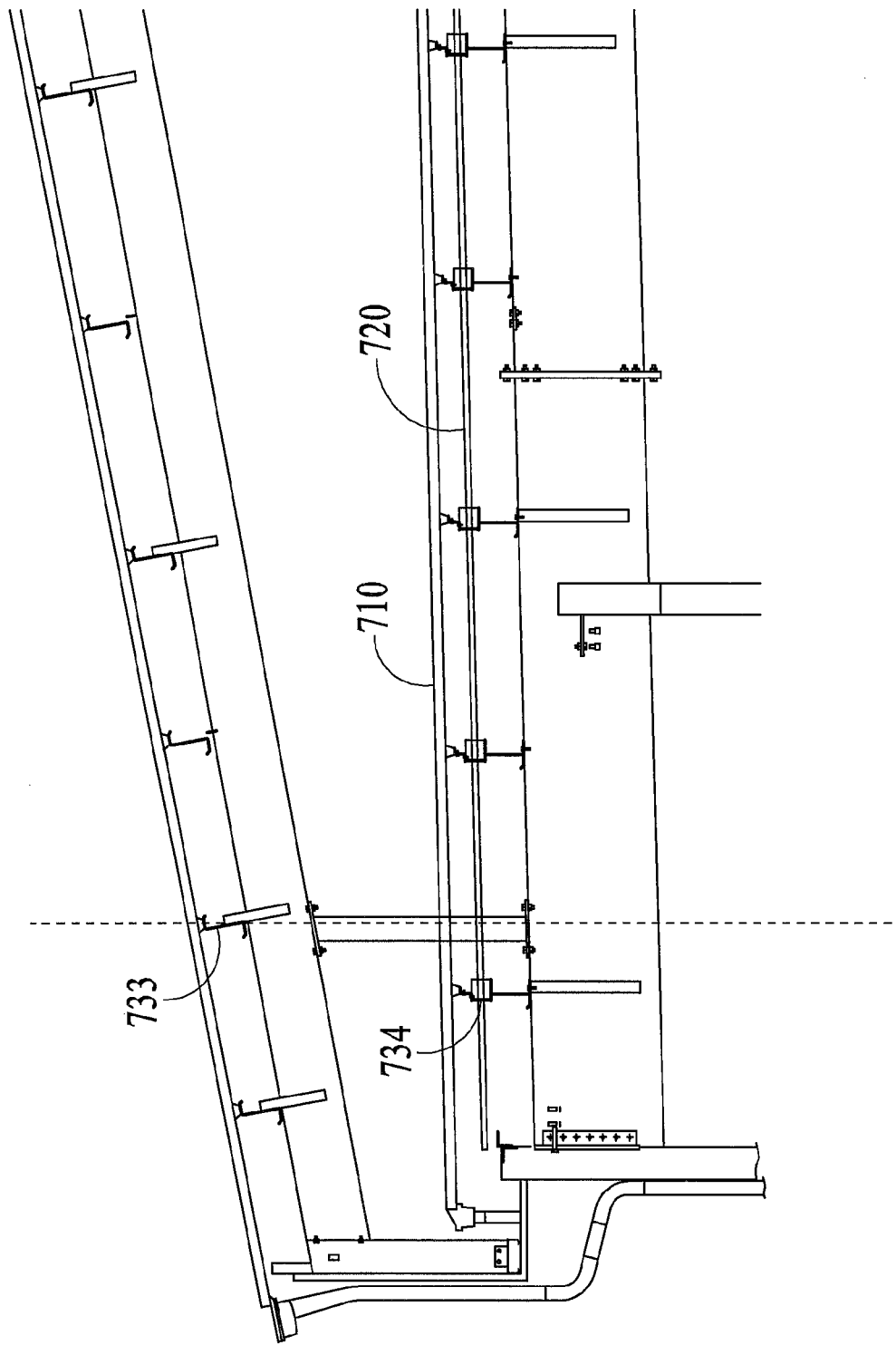
FIG. 7 depicts a side view of the framing members of the three roof structures of the data center according to one embodiment.

FIG. 6A depicts an example rainfly cavity according to one embodiment. The plenum cavity 550 shown in FIG. 5 is located below the lower roof of the three-level roof structure, which is below the rainfly cavity 606. As depicted in this embodiment, rainfly cavity 606 is located above the secondary roof system 610, which is further located above the lower roof structure and the hot air return region shown in FIG. 5. The rainfly cavity 606 includes rainfly roof 601, rainfly structure 602, rainfly columns 604, and framing members 622 including main support beams and perpendicular purlins. In one embodiment, the purlins of the rainfly roof 601 are offset with purlins sandwiched between the secondary roof 610 and the lower roof structure such that large airborne objects resulting from a hurricane or tornado will get lodged in one or more of the sets of framing members to keep it from penetrating all three roof levels. This is shown in FIG. 7, which depicts a side view of the framing members of the three roof structures of the data center according to one embodiment. That embodiment shows purlins 733 of the rainfly roof configured offset from the purlins 734 between the lower two roof structures 710 and 720.

Figure 6B:
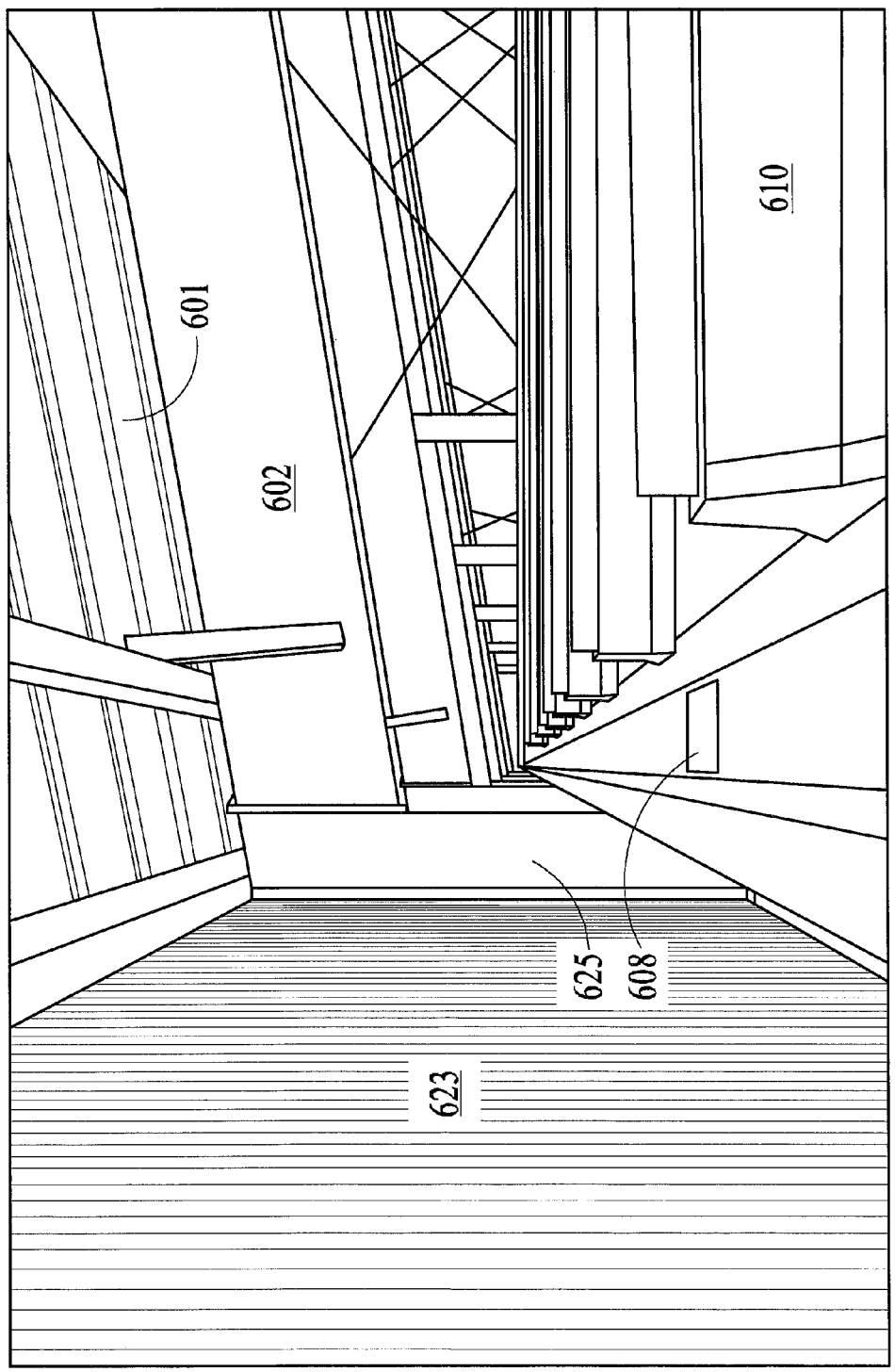
FIG. 6B depicts an example rainfly cavity according to one embodiment.

In the illustrated embodiment, the rainfly roof 601 is shown as an arched structure; however, as discussed above, the rainfly roof structure does not have to be explicitly arched. In addition, vents (not shown) can be provided on each end of the data center on the concrete walls 611 for ventilation of the rainfly cavity to prevent condensation build up on the rainfly roof 601. FIG. 6B depicts an alternative view of the rainfly cavity in one embodiment. In the illustration, rainfly cavity 606 includes rainfly roof 601 and the rainfly structure 602 located above the secondary roof system 610. As discussed previously, the secondary roof system 610 can include a secondary gutter system 608. Other embodiments include a fascia structure 625 configured to support fascia panel 623.

Figure 8:
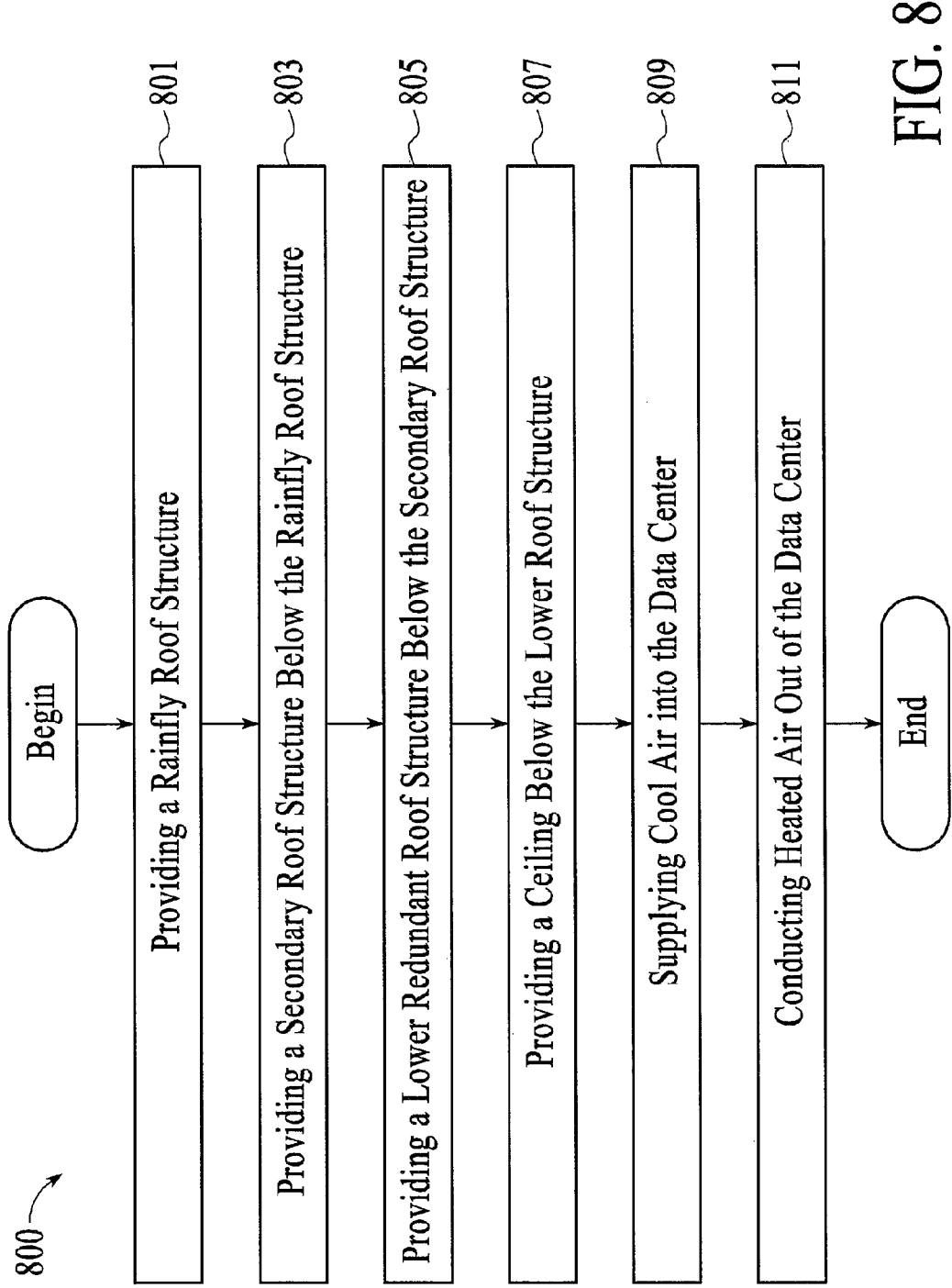
FIG. 8 depicts an example process of protecting electronic equipment in a data center according to one embodiment.

FIG. 8 depicts an example process of protecting electronic equipment in a data center. Process 800 begins at operations 801 through 805 where the three levels of roof structures are provided (rainfly, secondary and lower roof structures). Those roof structures are provided to shield the data center and all of its contents from rainwater and other more extreme weather events such as hurricanes, earthquakes or tornados. In one embodiment, insulation is provided between the secondary and lower redundant roof structures. Process 800 continues by providing a ceiling below the lower roof structure (operation 807). After all the structures are provided, cool air can be supplied into the data hall of the data center (operation 809) and hot air can be conducted out of the data center (operation 811). As discussed above, this can be accomplished through one or more cold or hot air openings located along the side of the data center and appropriately positioned below and above the data hall ceiling (plenum floor) respectively. This completes process 800 according to one illustrative embodiment.

Although described with reference to the preferred embodiments thereof, it will be readily apparent to those of ordinary skill in the art that modifications in the form and details of the disclosed embodiments can be made without departing from the spirit and scope thereof. Further, embodiments disclosed herein may include various operations as set forth above, or fewer or more operations; or operations in an order different from the order described. Accordingly, the scope should be judged in terms of the claims which follow as well as the legal equivalents thereof.

What is claimed is:

1. A data center comprising:
    a rainfly roof configured to protect the data center from adverse weather events disposed upon a rainfly structure having vertical support columns and a first set of framing members;
    a secondary roof structure disposed below the rainfly roof structure and coupled thereto by the vertical support columns;
    a lower roof structure disposed below the secondary roof structure and coupled thereto by the vertical support columns; and
    a second set of framing members disposed between the secondary and lower roof structures, wherein at least a part of the first set of framing members are offset from at least a part of the second set of framing members.

2. The data center of claim 1, wherein the first and second sets of framing members each comprise main support beams and purlins, the purlins being coupled perpendicularly to the main support beams.

3. The data center of claim 2, wherein the purlins of the first and second sets of framing members are offset to mitigate damage to the data center when an airborne objects striking the data center during severe weather becomes lodged in one or more of the sets of framing members.

4. The data center of claim 3, wherein the purlins of the first framing members are parallel to the purlins of the second framing members.

5. The data center of claim 1, further comprising a data hall within the data center having a ceiling disposed below the lower roof structure, wherein the data hall is adapted to store a plurality of cabinets to hold electronic equipment therein.

6. The data center of claim 5, further comprising one or more heat chimneys to conduct heated air out of the data hall through the ceiling into a hot air return region above such that the heated air escapes the data center through one or more hot air exhaust openings.

7. The data center of claim 6, wherein the cabinets of electronic equipment are positioned in a plurality of rows such that heated air conducts from the electronic equipment in each row through the chimneys into a hot air return region above the data hall ceiling.

8. The data center of claim 6, further comprising:
    one or more cold air supply openings located adjacent to a cold air supply region below the ceiling of the data hall; and
    one or more hot air exhaust openings located adjacent to the hot air return region above the ceiling of the data hall.

9. The data center of claim 8, wherein the data center is coupled with an apparatus to control a plurality of air conditioning units located alongside the outside of the data center adapted to be coupled with the cold air supply openings to deliver cool air into the data hall.

10. The data center of claim 9, wherein the hot air exhaust openings feed the heated air into the plurality of air conditioning units.

11. The data center of claim 5, wherein the secondary and the lower roof structures are coupled together using an airtight sealed joint allowing the data hall to be positively pressurized to facilitate air flow though the electronic equipment.

12. The data center of claim 1, wherein the secondary and lower roof structures are adapted to remain intact in the event of a rainfly roof structure failure.

13. The data center of claim 1, wherein the lower roof structure is adapted to remain intact in the event of failure in both the rainfly and secondary roof structures.

14. The data center of claim 1, further comprising an insulation layer coupled between the secondary and lower roof structures.

15. The data center of claim 1, further comprising an exterior drainage system coupled with the rainfly roof to drain rainwater away from the data center.

16. The data center of claim 1, wherein the secondary roof structure includes a second redundant drainage system disposed thereon adapted to drain rainwater away from the data center in case of leaks in the rainfly roof structure.

17. The data center of claim 1, draining excess rainwater away from the data center using a secondary roof structure below the rainfly roof structure in case of leaks in the rainfly roof structure, the secondary roof structure having a second drainage system.

18. The data center of claim 1, wherein all of the rainfly roof, the secondary roof structure and the lower roof structure are watertight.

19. A method for protecting electronic equipment in a data center comprising:
    shielding the data center from adverse weather events using a rainfly roof structure having vertical support columns and a first set of framing members;
    providing a secondary roof structure disposed below the rainfly roof structure and coupled thereto by the vertical support columns;
    providing a lower roof structure disposed below the secondary roof structure and coupled thereto by the vertical support columns; and
    providing a second set of framing members disposed between the secondary and lower roof structures; and
    offsetting at least a part of the first set of framing members from at least a part of the second set of framing members.

20. The method of claim 19, wherein the first and second sets of framing members each comprise main support beams and purlins, the purlins being coupled perpendicularly to the main support beams.

21. The method of claim 20, further comprising offsetting the purlins of the first and second sets of framing members to mitigate damage to the data center from airborne objects.

22. The method of claim 21, wherein the purlins of the first framing members are parallel to the purlins of the second framing members.

23. The method of claim 19, further comprising storing a plurality of cabinets holding electronic equipment in a data hall having a ceiling disposed below the lower roof structure.

24. The method of claim 23, further comprising conducting heated air out of the data hall through the ceiling into a hot air return region above using one or more heat chimneys such that the heated air escapes the data center out through the hot air exhaust openings.

25. The method of claim 23, further comprising positioning the cabinets of electronic equipment in a plurality of rows such that heated air is emitted from the electronic equipment in each row into the hot air return region above the data hall ceiling.

26. The method of claim 23, further comprising supplying cool air to the data hall through one or more cold air supply openings located adjacent to a cold air supply region below the ceiling of the data hall.

27. The method of claim 26, further comprising controlling a plurality of air conditioning units to be located alongside the cold air supply openings on the outside of the data center to deliver the cool air into the data hall.

28. The method of claim 27, further comprising feeding the heated air into the plurality of air conditioning units from the hot air exhaust openings further.

29. The method of claim 19, further comprising providing an insulating layer between the secondary and lower roof structures.

30. The method of claim 19, further comprising:
coupling the secondary and the lower roof structures together using an airtight sealed joint; and
positively pressurizing the data hall to facilitate air flow though the electronic equipment.

31. The method of claim 19, further comprising designing the secondary and lower roof structures to remain intact in the event of a rainfly roof structure failure.

32. The method of claim 19, further comprising designing the lower roof structure to remain intact in the event of failure in both the rainfly and secondary roof structures.

33. The data center of claim 19, further comprising coupling an exterior drainage system with the rainfly roof structure to drain rainwater away from the data center.

34. The method of claim 19, wherein all of the rainfly roof, the secondary roof structure and the lower roof structure are watertight.

* * * * *